United States Patent [19]
Sekine

[11] Patent Number: 5,596,730
[45] Date of Patent: Jan. 21, 1997

[54] INTERFACES FOR CROSS-CONNECT SYSTEM

[75] Inventor: Yasuharu Sekine, Tokyo, Japan

[73] Assignee: NEC Corporation, Japan

[21] Appl. No.: 269,065

[22] Filed: Jun. 30, 1994

[30] Foreign Application Priority Data

Jun. 30, 1993 [JP] Japan .................. 5-161990

[51] Int. Cl.$^6$ ...................................... G06F 3/00
[52] U.S. Cl. .................. 395/309; 395/311; 395/280;
 359/117; 359/135; 364/927.92; 364/927.99;
 364/238; 364/238.2; 364/239.1; 364/DIG. 1;
 370/359; 370/419
[58] Field of Search .................... 395/200, 309,
 395/311, 280; 370/16, 16.1, 85.12, 85.13,
 85.14, 85.15, 53, 60.1, 94.2; 340/825.01,
 827; 359/117, 135; 364/DIG. 1, DIG. 2

[56] References Cited

U.S. PATENT DOCUMENTS

| | | | |
|---|---|---|---|
| 4,967,405 | 10/1990 | Upp et al. ................ | 359/135 |
| 5,040,170 | 12/1988 | Upp et al. ................ | 359/135 |
| 5,144,297 | 9/1992 | Ohara ..................... | 340/825.79 |
| 5,189,410 | 2/1993 | Kosugi et al. ............ | 340/825.14 |
| 5,278,824 | 1/1994 | Kremer ................... | 370/15 |
| 5,291,485 | 3/1994 | Atity et al. .............. | 370/77 |
| 5,315,594 | 5/1994 | Noser ..................... | 370/110.1 |
| 5,365,518 | 11/1994 | Noser ..................... | 370/5 |
| 5,394,389 | 2/1995 | Kremer ................... | 370/16.1 |
| 5,416,768 | 5/1995 | Jahromi .................. | 370/55 |
| 5,493,565 | 2/1996 | Hanson et al. ........... | 370/55 |

Primary Examiner—Meng-Ai T. An
Attorney, Agent, or Firm—Ostrolenk, Faber, Gerb & Soffen, LLP

[57] ABSTRACT

An incoming interface for a cross-connect system comprises a first selector for coupling a signal from an incoming link to an STS-1 receive processor or to the first input of a second selector. A demapping circuit is connected to the STS-1 receive processor for extracting a DS3 payload signal and supplying it to the second input of the second selector. A DS3 receive processor is connected to the output of the second selector for processing a DS3 signal. A third selector has a first input connected to the STS-1 receive processor and a second input connected to the DS3 receive processor for establishing a connection between its first or second input to a cross-connect switch. An outgoing interface for the cross-connect system includes a DS3 transmit processor for processing a DS3 signal from the cross-connect switch. A third selector connects the output of DS3 transmit processor to a mapping circuit or one input of a sixth selector. A fifth selector has a first input for receiving an STS-1 signal from the cross-connect switch and a second input connected to the mapping circuit for establishing a connection between one of its first and second inputs to an STS-1 transmit processor. The other input of the sixth selector is connected to the STS-1 transmit processor for coupling one of its inputs to a corresponding outgoing link.

6 Claims, 3 Drawing Sheets

INTERFACES FOR CROSS-CONNECT SYSTEM

BACKGROUND OF THE INVENTION

1. Field of the Invention

The present invention relates generally to cross-connect systems for communications networks, and more particularly to interfaces used on opposite sides of a cross-connect switch for interfacing transmission links.

2. Description of the Related Art

In a cross-connect system, a plurality of incoming and outgoing interfaces are provided on opposite sides of a cross-connect switch for interfacing it to incoming and outgoing links. In a known cross-connect system for a synchronous network where STS-1 (synchronous transport signal level-1) and DS3 (digital signal-3) signals are intermixed, interfaces of different designs are used exclusively for STS-1 and DS3 signals. Specifically, the STS-1 interface for incoming links includes an STS-1 receive processor coupled to a corresponding STS-1 incoming link, and demapping circuit for extracting the DS3 signal which is stuffed into the payload of the STS-1 signal and a selector for coupling the STS-1 signal or the extracted payload signal to the cross-connect switch. The STS-1 interface for outgoing links includes a mapping circuit for providing payload mapping of an incoming DS3 signal for packing it into the payload of the STS-1 format and a selector for coupling the payload signal or an incoming STS-1 signal to an STS-1 transmit processor which is connected to a corresponding STS-1 outgoing link. The DS3 incoming interface includes a DS3 receive processor connected between a corresponding DS3 incoming link and the cross-connect switch, and the DS3 outgoing interface includes a DS3 transmit processor connected between the cross-connect switch and a corresponding DS3 outgoing link.

Because of the exclusive designs, the number of interfaces must be determined according to their types and traffic needs. It has been desired to provide interfaces that give flexibility in designing a network.

SUMMARY OF THE INVENTION

It is therefore an object of the present invention to provide high compatibility cross-connect interfaces that ensure flexibility for network design and inventory control.

The present invention obtains this object by the use of identical incoming interfaces and identical outgoing interfaces, regardless of the signal format.

According to a first aspect, the present invention provides an incoming interface for a cross-connect system. The incoming interface comprises a first selector, having an input terminal for receiving a signal from a corresponding incoming link, and first and second output terminals, for establishing a connection between the input terminal thereof and one of the first and second output terminals thereof. An STS-1 receive processor is connected to the first output terminal of the first selector for processing an STS-1 signal therefrom. A demapping circuit is connected to the STS-1 receive processor for extracting a DS3 payload signal from the processed STS-1 signal. A second selector is provided having a first input terminal connected to the demapping circuit, a second input terminal connected to the second output terminal of the first selector, and an output terminal, for establishing a connection between one of the first and second input terminals thereof and the output terminal thereof. A DS3 receive processor is connected to the output terminal of the second selector for processing a DS3 signal. A third selector has a first input terminal connected to the STS-1 receive processor, a second input terminal connected to the DS3 receive processor and an output terminal connected to a cross-connect switch, for establishing a connection between one of the first and second input terminals thereof and the output terminal thereof.

According to a second aspect, the present invention provides an outgoing interface for the cross-connect system. The outgoing interface comprises a DS3 transmit processor connected to the cross-connect switch for processing a DS3 signal, a first selector having an input terminal connected to the DS3 transmit processor and first and second output terminals, for establishing a connection between the input terminal thereof and one of the first and second output terminals thereof. A mapping circuit is connected to the first output terminal of the first selector for packing the processed DS3 signal into the payload of the STS-1 format. A second selector is provided having a first input terminal for receiving an STS-1 signal from the cross-connect switch, a second input terminal connected to the mapping circuit and an output terminal, for establishing a connection between one of the first and second input terminals thereof and the output terminal thereof. An STS-1 transmit processor is connected to the output terminal of the fifth selector for processing a the STS-1 signal. A third selector has a first input terminal connected to the STS-1 transmit processor, a second input terminal connected to the second output terminal of the first selector and an output terminal connected to a corresponding outgoing link, for establishing a connection between one of the first and second input terminals thereof and the output terminal thereof.

BRIEF DESCRIPTION OF THE DRAWINGS

The present invention will be described in further detail with reference to the accompanying drawings, in which.

DETAILED DESCRIPTION

Figure 1:
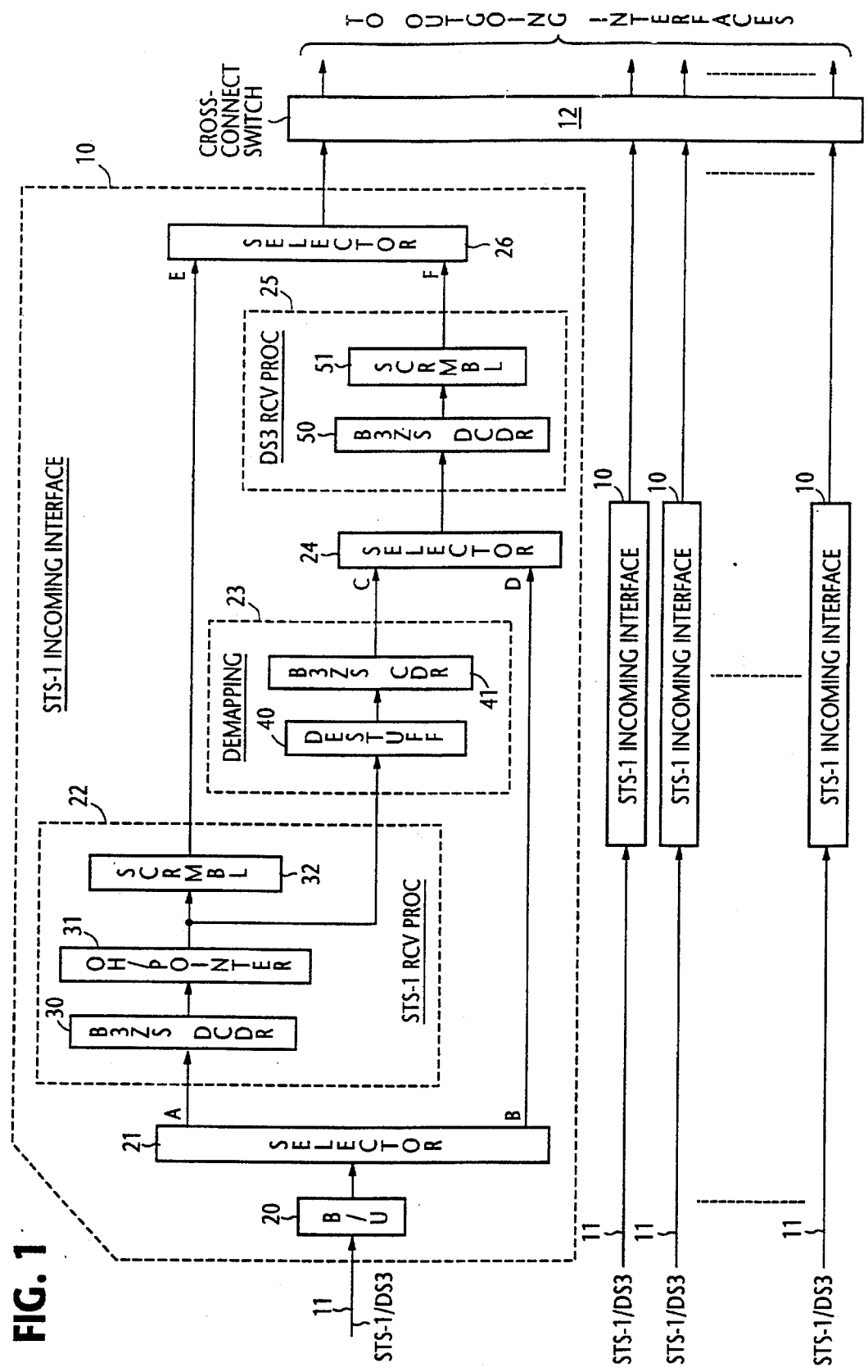
FIG. 1 is a block diagram of STS-1 incoming interfaces and a cross-connect system of a cross-connect system according to the present invention.
Figure 2:
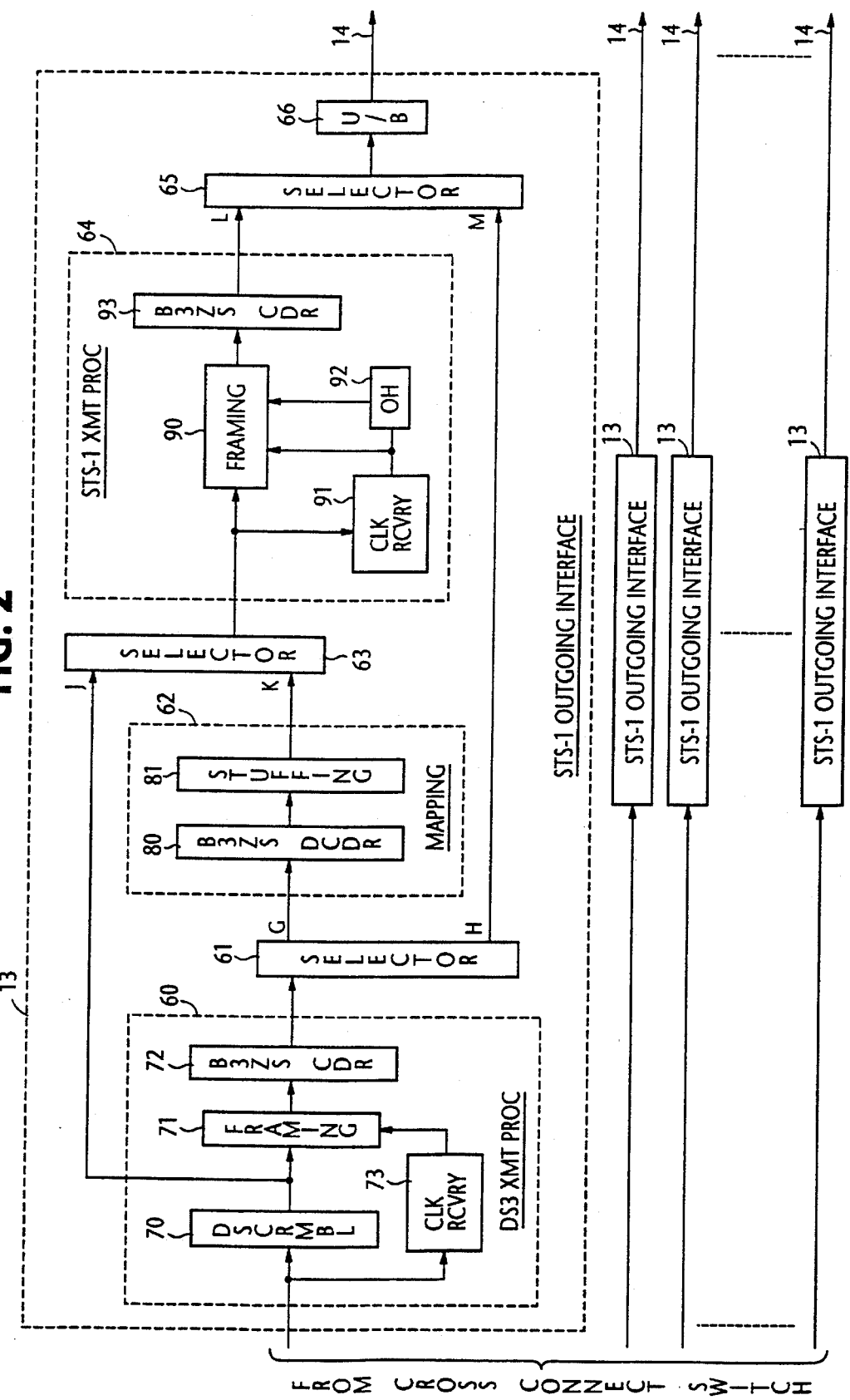
FIG. 2 is a block diagram of STS-1 outgoing interfaces of the cross-connect system of the present invention.

Referring now to FIGS. 1 and 2, a cross-connect system of the present invention comprises a plurality of STS-1 (synchronous transport signal level-1) incoming interfaces 10 for interfacing incoming links 11 to a cross-connect switch 12 and a plurality of STS1 outgoing interfaces 13 which provide interfacing between the cross-connect switch 12 and outgoing links 14.

In FIG. 1, each of the incoming interfaces 10 includes a bipolar-to-unipolar converter 20, an STS1 receive processor 22, a demapping circuit 23, a DS3 (digital signal-3) receive processor 25, and selectors 21, 24 and 26.

The incoming signal from the corresponding link 11 is a 51.840 Mbps STS-1 signal in which a 44.736 Mbps DS3 signal is packed as a payload or a DS3 payload equivalent. The incoming signal is converted by the B/U converter 20 and applied to the selector 21 where the signal is coupled to one of its output terminal A and B. The STS-1 receive processor 22 comprises a B3ZS decoder 30 connected to the output terminal A of selector 21 and an overhead/pointer processor 31 connected to the B3ZS decoder 30.

Binary three zero substitution (B3ZS) is the standard technique for the DS3 interface to augment a basic bipolar code by replacing all strings of three zeros with a special three-length code containing several pulses that purposely produce bipolar violations. The B3ZS decoder is to recognize the bipolar violation codes and replace them with three zeros to recover the original data.

Nine bytes of path overhead are included in every block of the information payload of the STS-1 frame format. This overhead is inserted when tributary data are packed into the synchronous payload envelope (SPE) and not removed until the tributary data are unpacked, thus providing end-to-end OAM (Operations, Administration and Maintenance) support independent of the path through the synchronous network which may involve numerous intermediate multiplexers, cross-connect switches or add-drop multiplexers. The synchronous payload envelope can begin in any byte position within the STS-1 payload envelope. The exact location of the nine bytes within the payload envelope is dependent on a pointer which is specified by setting the H1 and H2 pointer of the line overhead to the proper value.

The purpose of the overhead/pointer processor 31 is to process the overhead bytes and pointer bytes. The output of overhead/pointer processor 31 is connected to a scrambler 32 where the signal is scrambled using a generator polynomial. Since the signals processed by the cross-connect system are of repetitive patterns having a less content of clocking information than random data patterns, the signal is scrambled by scrambler 32 to produce random data patterns.

The scrambled output of the STS-1 receive processor 22 is applied to the E input of the selector 26, and the output of overhead/pointer processor 31 is applied to the demapping unit 23, which includes a destuffing circuit 40 for extracting the DS3 payload signal from the incoming STS-1 signal. A B3ZS coder 42 is connected to the destuffing circuit 41 to encode the extracted DS3 signal into the standard B3Z3 format.

The selector 24 has an input C connected to the output of demapping unit 23 and an input D connected to the output B of selector 21 for selectively coupling the B3ZS format signal from the demapping circuit 23 or from the output B of selector 21 to the input of the DS3 receive processor 25.

The DS3 receive processor 25 comprises a B3Z3 decoder 50 for decoding the B3ZS signal supplied either from the demapping circuit 23 or from the terminal B of selector 21. To the output of B3ZS decoder 50 is connected a scrambler 51 for scrambling the DS3 signal and applying the scrambled DS3 signal to the input F of selector 26. The selector 26 selectively couples the scrambled output of STS-1 receive processor 22 or DS3 receive processor 25 to the cross-connect switch 12.

The scrambled signal from any of the incoming interfaces 10 is switched through the cross-connect switch 12 and applied to any of the outgoing interfaces 13.

As shown in FIG. 2, each of the STS1 outgoing interfaces 13 comprises a DS3 transmit processor 60, a mapping circuit 62, an STS1 transmit processor 64, selectors 61, 63, 65, and a unipolar-to-bipolar converter 66.

The DS3 transmit processor 60 of each outgoing interface 13 includes a descrambler 70 connected to the corresponding output port of the cross-connect switch 12 for descrambling the scrambled STS-1 or DS3 signal. The output of descrambler 70 is connected to the input J of selector 63 and to a DS3 framing circuit 71. A B3ZS coder 72 is connected to the output of framing circuit 71. A clock recovery circuit 73 is provided for extracting clock timing from the DS3 signal. Using the extracted clock timing pulse, the framing circuit 71 transforms the scrambled DS3 signal into a frame sequence. The DS3 frame is then fed into a B3ZS coder 72 where it is further transformed to the B3ZS format by inserting the specified bipolar violation codes and applied to the input of selector 61.

The selector 61 couples the output of DS3 transmit processor 60 through its terminal G to the mapping circuit 62 or through its terminal H to the input terminal M of selector 65. Mapping circuit 62 includes a B3ZS decoder 80 for replacing the bipolar violation codes with three zeros. A stuffing circuit 81 is coupled to the decoder 80 for packing (payload mapping) the DS3 signal into the payload of the STS-1 format for application to the input terminal K of selector 63. The selector 63 connects either a descrambled STS-1 signal from descrambler 70 or a DS3 signal from mapping circuit 62 to the STS-1 transmit processor 64.

The STS-1 transmit processor 64 includes an STS-1 framing circuit 90 connected to the output of selector 63 for framing the output of selector 63 into an STS-1 frame sequence using clock timing recovered by a clock recovery circuit 91 and overhead bytes produced by an overhead processor 92. The STS-1 frame is then applied to a B3ZS coder 93 for inserting the specified bipolar violation codes. The B3ZS signal is applied to the input terminal L of selector 65.

The selector 65 provides coupling of the output of STS-1 transmit processor 64 or the output of DS3 transmit processor 60 via selector 61 to the U/B converter 66 for conversion from unipolar to bipolar format for transmission to the corresponding outgoing link 14.

In a practical aspect, an alarm and performance monitoring circuit may be included in all elements of the interfaces 10 and 13. However, such maintenance circuits are omitted for purposes of simplicity.

By appropriately setting the selectors of both incoming and outgoing interfaces, the cross-connect system of the present invention is capable of handling the following signals using the same types of incoming the outgoing interfaces:

|     | Incoming | Switch 12 | Outgoing |
| --- | --- | --- | --- |
| (1) | STS-1 | STS-1 | STS-1 |
| (2) | STS-1 | DS3 | STS-1 |
| (3) | DS3 | DS3 | STS-1 |
| (4) | STS-1 | DS3 | DS3 |
| (5) | DS3 | DS3 | DS3 |

Figure 3:
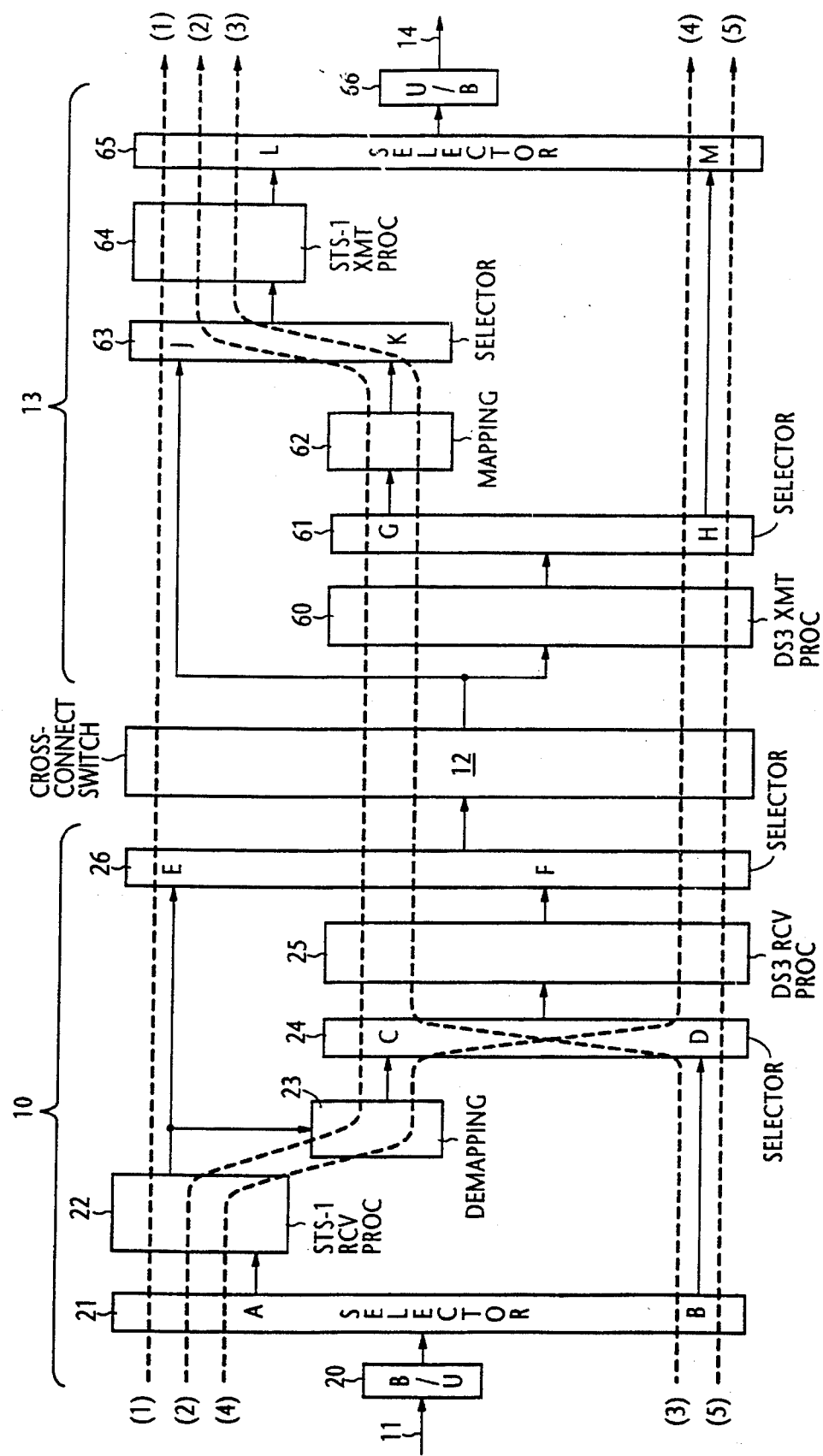
FIG. 3 is a block diagram of the cross-connect system of the present invention illustrating various paths of signals.

The operation of the cross-connect system of the present invention will be best understood with reference to FIG. 3 in which one incoming interface 10 and one outgoing interface 13 are illustrated for purpose of simplicity.

With the selectors 21, 26, 63 and 65 being switched to the terminals A, E, J and L, respectively, an incoming STS-1 signal is directly cross-connected by switch 12 from the incoming link 11 to the outgoing link 14 as indicated by numeral 1 in parentheses.

With the selectors 21, 24, 26, 61, 63 and 65 being switched to the terminals A, C, F, C, K and L, respectively, the signal at the incoming link 11 is in the STS-1 format, and the DS3 payload of the signal is extracted by demapping circuit 23 and cross-connected through switch 12 to the DS3 transmit processor 60 and thence to the mapping circuit 62 where it is packed into the payload of the STS-1 format for transmission through the STS-1 transmit processor 64 to the outgoing link 14 as indicated by numeral 2 in parentheses.

With the selectors 21, 24, 26, 61, 63 and 65 being switched to the terminals B, D, F, G, K and L, respectively, the signal at the incoming link 11 is in the DS3 format which is cross-connected through switch 12 to the DS3 transmit processor 60 and packed into the STS-1 format by mapping circuit 62 and applied to the outgoing link 14 as indicated by numeral 3 in parentheses.

By setting the selectors 21, 24, 26, 61 and 65 to the terminals A, C, F, H, and M, respectively, the signal at the incoming link 11 is in the STS-1 format and the DS3 payload of the signal is extracted by demapping circuit 23 and cross-connected through switch 12 to the DS3 transmit processor 60 and applied to the outgoing link 14 as indicated by numeral 4 in parentheses.

Setting the selectors 21, 24, 26, 61 and 65 to the terminals B, D, F, H, and M, respectively, allows a DS3 signal to be applied through the incoming link 11 to the DS3 receive processor 25, cross-connected by switch 12 to the DS3 transmit processor 60 and applied to the outgoing link 14 as indicated by numeral 5 in parentheses.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An incoming interface adapted for interfacing an incoming link to a cross-connect switch, comprising:

a first selector having an input terminal for receiving a signal from the incoming link, and first and second output terminals, said first selector establishing a connection between the input terminal thereof and one of said first and second output terminals thereof;

STS-1 (synchronous transport signal level-1) receive processor means connected to the first output terminal of the first selector for processing an STS-1 signal therefrom;

demapping means connected to the STS-1 receive processor for extracting a DS3 (digital signal-3) payload signal from the processed STS-1 signal;

a second selector having a first input terminal connected to said demapping means, a second input terminal connected to the second output terminal of said first selector, and an output terminal, said second selector establishing a connection between one of the first and second input terminals thereof and the output terminal thereof;

DS3 receive processor means connected to the output terminal of said second selector for processing a DS3 signal; and a third selector having a first input terminal connected to said STS-1 receive processor means, a second input terminal connected to the DS3 receive processor means, and an output terminal adapted for connection to said cross-connect switch, said third selector establishing a connection between one of the first and second input terminals thereof and the output terminal thereof.

2. An outgoing interface for interfacing a cross-connect switch to an outgoing link, comprising:

DS3 (digital signal-3) transmit processor means for processing a DS3 signal from said cross-connect switch;

a first selector having an input terminal connected to the DS3 transmit processor means, and first and second output terminals, said first selector establishing a connection between the input terminal thereof and one of the first and second output terminals thereof;

mapping means connected to the first output terminal of the first selector for packing the processed DS3 signal into the payload of the STS-1 (synchronous transport signal level-1) format;

a second selector having a first input terminal for receiving an STS-1 signal from the cross-connect switch, a second input terminal connected to the mapping means, and an output terminal, said second selector establishing a connection between one of the first and second input terminals thereof and the output terminal thereof;

STS-1 transmit processor means connected to the output terminal of said second selector for processing an STS-1 signal; and a third selector having a first input terminal connected to the STS-1 transmit processor means, a second input terminal connected to the second output terminal of the first selector, and an output terminal adapted for connection to the outgoing link, said third selector establishing a connection between one of the first and second input terminals thereof and the output terminal thereof.

3. A cross-connect system comprising:

a plurality of incoming interfaces respectively corresponding to incoming links;

a plurality of outgoing interfaces respectively corresponding to outgoing links; and a cross-connect switch connected between the incoming interfaces and the outgoing interfaces, each of the incoming interfaces comprising:

a first selector having an input terminal for receiving a signal from the corresponding incoming link, and first and second output terminals, said first selector establishing a connection between the input terminal thereof and one of the first and second output terminals thereof;

STS-1 (synchronous transport signal level-1) receive processor means connected to the first output terminal of the first selector for processing an STS-1 signal therefrom;

demapping means connected to the STS-1 receive processor means for extracting a DS3 (digital signal-3) payload signal from the processed STS-1 signal;

a second selector having a first input terminal connected to the demapping means, a second input terminal connected to the second output terminal of the first selector, and an output terminal, said second selector establishing a connection between one of the first and second input terminals thereof and the output terminal thereof;

DS3 receive processor means connected to the output terminal of the second selector for processing a DS3 signal; and a third selector having a first input terminal connected to the STS-1 receive processor means, a second input terminal connected to the DS3 receive processor means and an output terminal connected to said cross-connect switch, said third selector establishing a connection between one of the first and second input terminals thereof and the output terminal thereof, each of said outgoing interfaces comprising:

DS3 transmit processor means connected to said cross-connect switch for processing a DS3 signal;

a fourth selector having an input terminal connected to the DS3 transmit processor means, and first and second output terminals, said fourth selector establishing a connection between the input terminal thereof and one of the first and second output terminals thereof;

mapping means connected to the first output terminal of the fourth selector for packing the processed DS3 signal into the payload of the STS-1 format;

a fifth selector having a first input terminal for receiving an STS-1 signal from the cross-connect switch, a second input terminal connected to the mapping means and an output terminal, said fifth selector establishing a connection between one of the first and second input terminals thereof and the output terminal thereof;

STS-1 transmit processor means connected to the output terminal of said fifth selector for processing an STS-1 signal; and a sixth selector having a first input terminal connected to the STS-1 transmit processor means, a second input terminal connected to the second output terminal of the fourth selector, and an output terminal connected to the corresponding outgoing link, said sixth selector establishing a connection between one of the first and second input terminals thereof and the output terminal thereof.

4. An incoming interface adapted for interfacing an incoming link to a cross-connect switch, comprising:

a first selector having an input terminal for receiving a signal from the incoming link and first and second output terminals, said first selector establishing a connection between the input terminal thereof and one of said first and second output terminals thereof;

STS-1 (synchronous transport signal level-1) receive processor connected to the first output terminal of the first selector for processing an STS-1 signal therefrom;

demapping circuit connected to the STS-1 receive processor for extracting a DS3 (digital signal-3) payload signal from the processed STS-1 signal;

a second selector having a first input terminal connected to said demapping circuit, a second input terminal connected to the second output terminal of said first selector, and an output terminal, said second selector establishing a connection between one of the first and second input terminals thereof and the output terminal thereof;

DS3 receive processor connected to the output terminal of said second selector for processing a DS3 signal; and a third selector having a first input terminal connected to said STS-1 receive processor, a second input terminal connected to the DS3 receive processor, and an output terminal adapted for connection to said cross-connect switch, said third selector establishing a connection between one of the first and second input terminals thereof and the output terminal thereof.

5. An outgoing interface for interfacing a cross-connect switch to an outgoing link, comprising:

DS3 (digital signal-3) transmit processor for processing a DS3 signal from said cross-connect switch;

a first selector having an input terminal connected to the DS3 transmit processor and first and second output terminals, said first selector establishing a connection between the input terminal thereof and one of the first and second output terminals thereof;

mapping circuit connected to the first output terminal of the first selector for packing the processed DS3 signal into the payload of the STS-1 (synchronous transport signal level-1) format;

a second selector having a first input terminal for receiving an STS-1 signal from the cross-connect switch, a second input terminal connected to the mapping circuit, and an output terminal, said second selector establishing a connection between one of the first and second input terminals thereof and the output terminal thereof;

STS-1 transmit processor connected to the output terminal of said second selector for processing an STS-1 signal; and a third selector having a first input terminal connected to the STS-1 transmit processor, a second input terminal connected to the second output terminal of the first selector, and an output terminal adapted for connection to the outgoing link, said third selector establishing a connection between one of the first and second input terminals thereof and the output terminal thereof.

6. A cross-connect system comprising:

a plurality of incoming interfaces respectively corresponding to incoming links;

a plurality of outgoing interfaces respectively corresponding to outgoing links; and a cross-connect switch connected between the incoming interfaces and the outgoing interfaces, each of the incoming interfaces comprising:

a first selector having an input terminal for receiving a signal from the corresponding incoming link, and first and second output terminals, said first selector establishing a connection between the input terminal thereof and one of the first and second output terminals thereof;

STS-1 (synchronous transport signal level-1) receive processor connected to the first output terminal of the first selector for processing an STS-1 signal therefrom;

demapping circuit connected to the STS-1 receive processor for extracting a DS3 (digital signal-3) payload signal from the processed STS-1 signal;

a second selector having a first input terminal connected to the demapping circuit, a second input terminal connected to the second output terminal of the first selector, and an output terminal, said second selector establishing a connection between one of the first and second input terminals thereof and the output terminal thereof;

DS3 receive processor connected to the output terminal of the second selector for processing a DS3 signal; and a third selector having a first input terminal connected to the STS-1 receive processor, a second input terminal connected to the DS3 receive processor and an output terminal connected to said cross-connect switch, said third selector establishing a connection between one of the first and second input terminals thereof and the output terminal thereof, each of said outgoing interfaces comprising:

DS3 transmit processor connected to said cross-connect switch for processing a DS3 signal;

a fourth selector having an input terminal connected to the DS3 transmit processor, and first and second output terminals, said fourth selector establishing a connection between the input terminal thereof and one of the first and second output terminals thereof;

mapping circuit connected to the first output terminal of the fourth selector for packing the processed DS3 signal into the payload of the STS-1 format;

a fifth selector having a first input terminal for receiving an STS-1 signal from the cross-connect switch, a second input terminal connected to the mapping circuit and an output terminal, said fifth selector establishing a connection between one of the first and second input terminals thereof and the output terminal thereof;

STS-1 transmit processor connected to the output terminal of said fifth selector for processing an STS-1 signal; and a sixth selector having a first input terminal connected to the STS-1 transmit processor, a second input terminal connected to the second output terminal of the fourth selector, and an output terminal connected to the corresponding outgoing link, said sixth selector establishing a connection between one of the first and second input terminals thereof and the output terminal thereof.

* * * * *